US012499141B2

(12) United States Patent
Rizk et al.

(10) Patent No.: US 12,499,141 B2
(45) Date of Patent: Dec. 16, 2025

(54) ONTOLOGY-BASED DATA VISUALIZATION

(71) Applicant: International Business Machines Corporation, Armonk, NY (US)

(72) Inventors: Yara Rizk, Cambridge, MA (US); Zilu Tang, Cambridge, MA (US); Yasaman Khazaeni, Needham, MA (US); Vatche Isahagian, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 17/472,250

(22) Filed: Sep. 10, 2021

(65) Prior Publication Data
US 2023/0081598 A1    Mar. 16, 2023

(51) Int. Cl.
*G06F 16/334*    (2025.01)
*G06F 16/242*    (2019.01)
*G06F 16/248*    (2019.01)
*G06F 16/338*    (2019.01)
*G06F 16/9032*    (2019.01)
*G06F 40/169*    (2020.01)
*G06F 40/284*    (2020.01)
*G06F 40/30*    (2020.01)
*G06T 11/20*    (2006.01)

(52) U.S. Cl.
CPC ........ *G06F 16/3344* (2019.01); *G06F 16/243* (2019.01); *G06F 16/248* (2019.01); *G06F 16/338* (2019.01); *G06F 16/90332* (2019.01); *G06F 40/169* (2020.01); *G06F 40/284* (2020.01); *G06F 40/30* (2020.01); *G06T 11/206* (2013.01)

(58) Field of Classification Search
CPC ............... G06F 16/3344; G06F 16/243; G06F 16/90332; G06F 16/338; G06F 16/248; G06F 40/284
See application file for complete search history.

(56) References Cited

U.S. PATENT DOCUMENTS

| 8,812,298 B1 * | 8/2014 | Wolfram ................. G06F 40/56 704/251 |
| 9,720,984 B2 | 8/2017 | McClung |
| 10,169,454 B2 | 1/2019 | Ait-Mokhtar |
| 10,452,668 B2 | 10/2019 | Heimendinger et al. |
| 10,572,473 B2 | 2/2020 | Allen et al. |

(Continued)

FOREIGN PATENT DOCUMENTS

WO    WO 2020/042530 A1    3/2020

OTHER PUBLICATIONS

Adadi et al. Aug. 5, 2018, "Peeking Inside the Black-Box: A Survey on Explainable Artificial Intelligence (XAI)" (Year: 2018).*

(Continued)

*Primary Examiner* — Matthew J Ellis
(74) *Attorney, Agent, or Firm* — CHIP LAW GROUP

(57) ABSTRACT

A data visualization method, system, and computer program product that includes identifying an intent from a natural language query in a conversation with a conversational system, utilizing verbiage from the natural language query and the intent to determine one or more data columns for visualization of results of the natural language query, and displaying a visualization of the determined one or more data columns.

14 Claims, 8 Drawing Sheets

(56) References Cited

U.S. PATENT DOCUMENTS

| | | | |
|---|---|---|---|
| 10,762,299 B1* | 9/2020 | Parastatidis | G10L 15/22 |
| 10,846,318 B1 | 11/2020 | McNabney et al. | |
| 10,943,072 B1* | 3/2021 | Jaganmohan | G06N 5/041 |
| 11,030,255 B1 | 6/2021 | Tory et al. | |
| 11,263,405 B2* | 3/2022 | Gnanasambandam | G16H 10/20 |
| 2004/0230572 A1 | 11/2004 | Omoigui | |
| 2012/0150548 A1* | 6/2012 | Rajagopalan | G06Q 10/067 705/1.1 |
| 2012/0191716 A1 | 7/2012 | Omoigui | |
| 2013/0096946 A1 | 4/2013 | Shah | |
| 2014/0280256 A1* | 9/2014 | Wolfram | G06F 40/205 707/755 |
| 2015/0006518 A1* | 1/2015 | Baumgartner | G06F 16/9535 707/723 |
| 2016/0179945 A1 | 6/2016 | Lastra Diaz | |
| 2018/0137179 A1* | 5/2018 | Kawanabe | G06F 16/951 |
| 2019/0340281 A1* | 11/2019 | Maiti | G06F 16/24534 |
| 2019/0347118 A1* | 11/2019 | Mukherjee | G06F 9/45512 |
| 2020/0019608 A1* | 1/2020 | Gentile | G06F 18/2178 |
| 2020/0090189 A1* | 3/2020 | Tutuk | G06F 16/248 |
| 2020/0117740 A1* | 4/2020 | Schmidt | G06F 16/9535 |
| 2021/0326519 A1* | 10/2021 | Lin | G06F 40/18 |
| 2022/0156823 A1* | 5/2022 | Tremblay | G06F 40/20 |

OTHER PUBLICATIONS

Mel, et al. "The NIST Definition of Cloud Computing". Recommendations of the National Institute of Standards and Technology. Nov. 16, 2015.

* cited by examiner

Under-specified inputs
- *"plot this"* ← Lack graph type and column name
- *"plot a histogram"* ← Lack column name
- *"plot some graph with credit score"* ← Lack graph type
- *"plot a scatter plot with yearly income"*

ONTOLOGY-BASED DATA VISUALIZATION

BACKGROUND

The present invention relates generally to a data visualization method, and more particularly, but not by way of limitation, to a system, method, and computer program product for ontology-based data visualization that creates graphical displays from a chatbot interaction.

Automated Digital Worker (ADW) skills are written to support workflow function executions. Examples of ADW skills are Digital Business Automation (DBA), Operations Decision Manager (ODM) and Business Process Management (BPM).

These services generate data events that can be queried by the user using natural language. Conventional techniques include a visualization engine for a knowledge management system that parses a visualization request, generates a query based on the ontology, runs the query, and uses visualization rules to plot the query results.

However, the conventional visualization engines are based on a single-turn conversation, and use preset visualization rules that may result in a visualization being uninteresting (e.g., as described later) due to the lack of dynamic adoption in the rules (i.e., hard-coded static rules are used based on a single-turn conversation). That is, a 'turn' in a conversation is marked by one back-and-forth interaction: the user speaks and the bot follows, or vice-versa. Singe-turn conversations result when many of the tasks performed are simple enough that they can be completed with just one response, with no need for any further questions or exchanges. In other words, these tasks are completed within a single conversational turn. In contrast, if more than one turn occurs in an interaction (i.e., especially if complex tasks are involved), this becomes a multi-turn conversation.

Therefore, the conventional techniques lack proper consideration of context from a multi-turn conversation. Further, the conventional techniques output visualizations that have no meaning (and no way to confirm that the visualization would have meaning).

SUMMARY

Thus, the inventors have considered a technical solution to the technical problem in the conventional techniques by introducing a technique that ensures a meaningful visualization output via a dual analysis of ontology and "interestingness" (as described later) for a multi-turn conversation with a chatbot. Thereby, the invention provides a technical improvement via interaction with the ontology, features, a chatbot, and may optimize the output using a feedback loop (i.e., learning).

In an exemplary embodiment, the present invention can provide a computer-implemented data visualization method, the method including identifying an intent from a natural language query in a conversation with a conversational system, utilizing verbiage from the natural language query and the intent to determine one or more data columns for visualization of results of the natural language query, and displaying a visualization of the determined one or more data columns.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings.

Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 2 exemplarily depicts a deficient visualization using conventional techniques;

FIG. 3 exemplarily depicts examples of intent via step 102 of method 100 according to an embodiment of the present invention;

DETAILED DESCRIPTION

Figure 1:
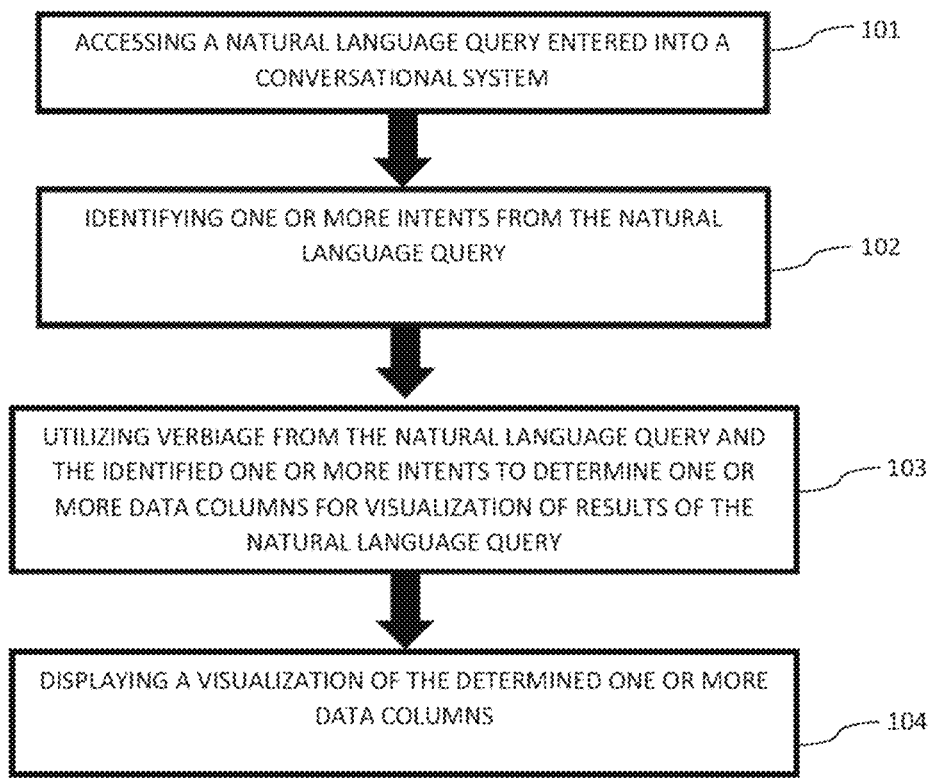
FIG. 1 exemplarily shows a high-level flow chart for a data visualization method 100 according to an embodiment of the present invention.

The invention will now be described with reference to FIG. 1-8, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the exemplary method 100 depicted in FIG. 1, the data visualization method 100 includes various steps for providing meaningful plots of data based on interaction with a chatbot.

Figure 6:
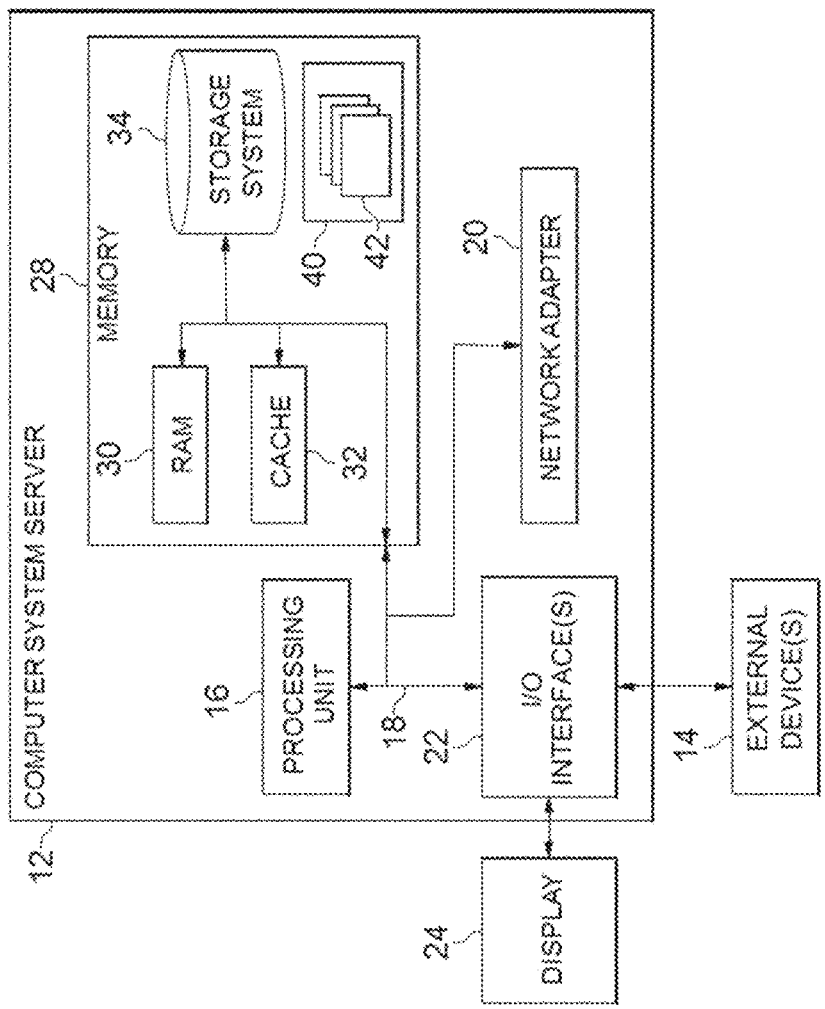
FIG. 6 depicts a cloud computing node 10 according to an embodiment of the present invention.

As shown in at least FIG. 6, one or more computers of a computer system 12 according to an embodiment of the present invention can include a memory 28 having instructions stored in a storage system to perform the steps of FIG. 1.

The data visualization method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 6-8) may be implemented in a cloud environment 50 (see e.g., FIG. 7), it is nonetheless understood that the present invention can be implemented outside of the cloud environment.

With reference generally to FIGS. 1-5, Automated Digital Worker (ADW) Skills are written to support workflow function executions. Examples of ADW skills are Digital Business Automation (DBA), Operations Decision Manager (ODM), and Business Process Management (BPM). These services generate data events that can be queried by the user using natural language. These services have several artifacts such as Business Object Model (BOM), Key-value property verbalization (VOC), and parameter files that can be used automatically to infer the best data columns to visualize.

Since the BOM file is already uploaded to the invention, this is used to create programmatically appropriate entities with their values and their synonyms, programmatically create appropriate intents with examples, and programmatically create dialogue nodes that perform slot filling to get the context variables.

For example, the BOM file can include a statement such as "a flight has a departure time" which can be used by the invention to create a slot filling not to get the context variable "departure time" from the user when they ask to book a flight. Also, the BOM file can include a statement such as "a flight has a departure city and an arrival city" which can be mapped to an entity "city" which lists city names with major airports (i.e., using appropriate databases). This entity can be used in the conversational agent to identify when a user provides their departure and arrival cities in natural language.

The VOC file could contain synonyms to "arrival city", for example, like "destination" which can also be included when creating the entity. Finally, the intent of "booking a flight" and corresponding examples ("I want to reserve a flight", "purchase a plane ticket", etc.) can be derived from the BOM/VOC files and input/output dictionaries which can contain information like "a flight is associated with tickets", "tickets give permission to fly from a given city to a destination", etc. which define the concepts related to booking travel. Synonyms for each can be found in the VOC file and through syntactic parsing.

Figure 2:
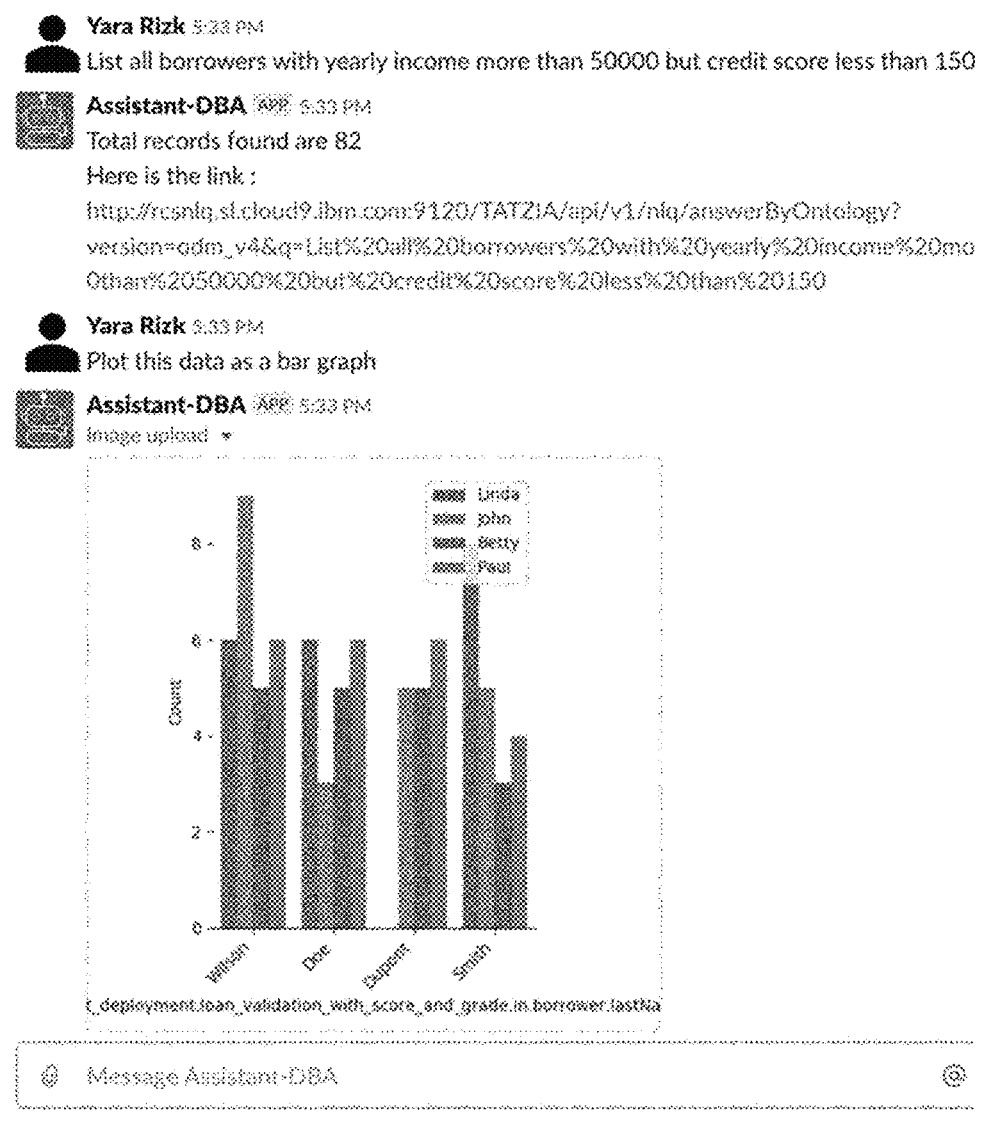

As shown in the example of FIG. 2, an input request for a list with all borrowers with yearly income more than $50,000, but with a credit score less than 150, is requested. The chatbot provides the list and then the user requests to "plot this data as a bar graph".

However, the conventional techniques would plot a visualization (i.e., a bar graph as shown) that is not relevant about to what the user cares. That is, the bar graph plots a number of people with loan applications with the same last name, which has nothing to do with the query that was just asked for in the chatbot. The user actually wants to know how many people have a credit score less than 150 with an income more than $50,000.

However, the invention considers that it is not user-friendly to ask for every piece of data required to plot a meaningful visualization (e.g., x-axis, y-axis, inputs of each axis, type of graph, etc.). Thus, the invention via the method 100 leverages context in the conversation that the context can be used and also using the BOM/VOC for context that can help create a graph that is needed. For example, an exemplary result of the method 100 in relation to the conversation of FIG. 2 would be the y-axis with a count and the x-axis with "people having both income over $50,000 and credit score less than 150". Therefore, a graph will easily show the number of people fitting this category created by the conversation (i.e., a multiple-turn conversation that is able to extract context).

Also, the invention is able to identify that the graph shown in FIG. 2 is meaningless by creating an "interestingness" factor so that the invention can filter out providing a meaningless graph. In doing so, the invention has a dynamic set of rules to create visualizations that are adapted to each individual conversation with a chatbot.

With respect to FIG. 1, and as a high-level description of the method 100, in step 101, a natural language query entered into a conversational system is assessed. For example, the multi-turn conversation is parsed for context. As mentioned above, a "turn" is a collection of utterances where each of a user and the chatbot speak at least once.

In step 102, one or more intents from the natural language query are identified. FIG. 3 exemplarily depicts a communication of example intents. Each of the four inputs requires additional context or information that the invention provides. Without column names or a type of graph, an output graph could be meaningless such as if the graph provides a scatter plot with one data point or a pie chart with only one pie slice.

For example, "plot this data" lacks a specific graph-type (i.e., visualization) and also the column names (i.e., x-axis, y-axis, data points, etc.). "Plot a histogram" provides the type of graph, but lacks the column names for the histogram to complete the graph. "Plot some graph with credit score" lacks the type of graph, but provides specific instructions on the information for the graph. And, "plot a scatter plot with yearly income" provides the type of graph and the column names.

Figure 4:
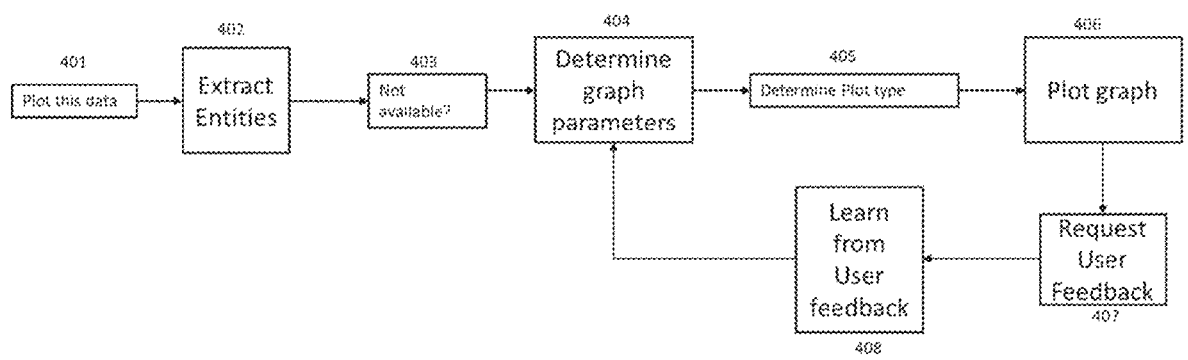
FIG. 4 exemplarily depicts details of step 103 of method 100 according to an embodiment of the present invention.

In step 103, verbiage from the natural language query and the identified one or more intents is utilized to determine one or more data columns for visualization of results of the natural language query. FIG. 4 describes the step-by-step process for determining the data columns based on the natural language query.

FIG. 4 depicts the detailed steps when the conversation has the least amount of information when requesting a visualization. In other words, FIG. 4 depicts the process when the user states "plot this data" (e.g., verbiage input for step 401) or the like.

That is, by saying "plot this data" as verbiage, both a plot-type and graph parameters (i.e., columns on which to base the plot) are missing. If more information is provided by the user such as "plot credit score", then the plot-type will need to be determined and the graph parameters will utilize the additional information (i.e., "credit score" as a parameter) to limit the computing time required to provide the visualization.

With respect to the user-request in the conversation of "plot this" (e.g., see FIG. 3), entities (step 402) are extracted from the context in the conversation as well as from the BOM/VOC files.

The verbiage comes from the request in the natural language query to "plot this" based on the conversation of sentences that fall into one of the groups. The entities are extracted from the conversation (e.g., credit score, salary, histogram, etc. is context) and the context is parsed to extract the entities.

However, when available (i.e., step 403 "NO"), the entities are used to determine the graph parameters in step 404. Entities may include words in the phrase that can be identified to belong to a specific category (e.g., loan_amount belongs to the category of column_name). The graph parameters may include the variables that can be controlled to produce different graphs (e.g., x-axis and y-axis values, plot type). Features are used to quantitatively represent data (e.g., entities may be represented by their characteristics: loan_a- mount is a continuous numeric, first name is a categorical string, etc.). The graph parameters are then utilized to determine the plot-type in step 405 (i.e., histogram, pie chart, scatter plot, bar graph, etc.).

To determine the plot-type in step 405, the entities are categorized as features as either "continuous" or "categorical" (i.e., the label based on the features). Continuous" is data that can take any value, and may include in the present example, salary, credit score, and loan amount. Categorical represent types of data which may be divided into groups. Examples of categorical variables are age, educational level, quarter of calendar, type of a loan, etc.

Bar graphs, line graphs, and pie charts are useful for displaying categorical data. Histograms are useful for displaying continuous data. Bar graphs, line graphs, and histograms have an x- and y-axis. If there is a combination of entities that fall into different categories of entities (i.e., the entities are type of loan and salary), then a plot type that is interesting (described later) is used such as a bar graph as bar graphs are typically interesting when there is a categorical entity and a continuous entity.

Referring back to FIG. 1, in step 104, a visualization of the determined one or more data columns is displayed according to a result of the determined graph parameters and the determined plot-type (i.e., plot graph 406 in FIG. 4).

In some embodiments, the entities are not available (i.e., "YES" in step 403). In such an embodiment, the graph parameters are determined according to steps 4041-4046 of FIG. 5.

The graph parameters (i.e., column names in 4041) are determined based on missing data. The invention determines some of the parameters where the parameters are column names and the invention generates different versions of the plot (i.e., generate plots 4042) that can be produced. For example, based on the column names, a bar graph, a scatter plot, a donut chart, a pie graph, etc. are all generated.

The invention uses a dynamic set of rules to calculate an interestingness score in step 4043 that is updated based on the learning from user feedback (e.g., as described later in steps 407-408). For example, an interesting bar graph includes continuous data and categorical data and an interesting scatter plot has both columns as continuous data. Instead of generating static rules stating such observations (e.g., bar graph is for a continuous data and a categorical data), the invention uses a supervised machine learning to train a model that learns the rules of when to choose a bar graph or what type of data goes well with a certain graph type. The machine learning model classifies the various graphs as 'interesting' or 'not interesting'.

Then, the invention calculates in step 4043 an "interestingness" score (e.g., a score of 1 to 10) of each of the plots. "Interestingness" (i.e., "interesting score", "interestingness score", etc.) is a mathematical notion of Shannon entropy based on communication theory where entropy means the more chaotic the data, the more entropy. That is, discrete data has Shannon entropy, whereas continuous data has an entropy extension to a continuous domain, and the two variables are correlated to determine interestingness.

In other words, more information means more entropy (i.e., a greater "interestingness score") which correlates to a potentially more meaningful plot. For example, a plot with all integers of "1 s" or a pie chart with a single pie slice is low entropy, whereas a complete random set of numbers is high entropy.

Figure 5:
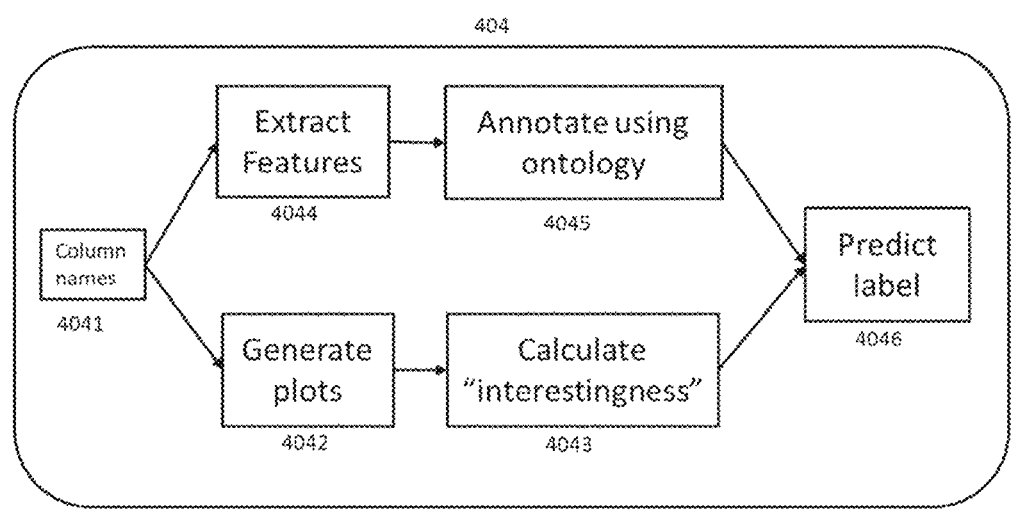
FIG. 5 exemplarily depicts detailed steps for determining graph parameters of FIG. 4 according to an embodiment of the present invention.

In the "calculating interesting score" of FIG. 5, plots that have more information have more entropy. Thus, a donut chart with one color/arc or a scatter plot with one dot has low entropy, and thus are not that interesting. Accordingly, high information (i.e., high entropy and a greater "interestingness score") means "more interesting" from a communication theory standpoint.

Therefore, the invention picks a label (i.e., type of plot) with more data that has more entropy that may be more interesting. The user can set thresholds for entropy based on how much time a user has to interact with the data (e.g., lower entropy upper threshold if the user has less time to view the data).

Or, the user can filter out types of plots and exclude the types of plots from being used (i.e., a user may only want bar graphs and pie charts, so the user excludes scatter plots).

However, although the interestingness score very efficiently filters out uninteresting plots that have low entropy, the interestingness score may not be a perfect computation in that a plot could be "too interesting" by having too much data (i.e., too much entropy) to be understandable.

For example, a scatter plot with a high number of points may have high entropy and high interestingness, but it is not useful as it provides a much too complex view.

Accordingly, the invention also extracts features in step 4044 (i.e., a type of the data) from the column names, and annotates them using an ontology in step 4045. That is, the features are defined as a constraint and the plot type is selected based on ontology (i.e., a bar graph is meaningful with one continuous column and one categorical column).

Thereby, a high "interestingness" score that does not match a rule for a meaningful plot in the ontology according to the features will not be used. In other words, the features of each of the columns are extracted, an ontology is used to annotate the features, and then a result from the ontology and the interestingness score are combined to predict a label in step 4046 (i.e., is the plot interesting and does the ontology make sense while considering a threshold value).

This label is then output to step 405 (see FIG. 4) where the plot type is determined and the graph is plotted (i.e., a visualized is output to the user) in step 406 shown in FIG. 4.

Once the visualization is output, in step 407, user feedback is requested. The user can provide feedback such as "this scatter plot has too much data and is meaningless". Then, the invention learns from the user feedback in step 408 by adjusting a max entropy value for scatter plots for this specific user. For example, if the entropy value for the current scatter plot was 10, the invention will adjust a max entropy value to being 9 or less to provide a scatter plot and still have a meaningful plot. Thereby, a loop occurs in which the invention will either learn that entropy values of "9" for a scatter plot are acceptable but that a value of "10" provides too much data. If the user continues to provide feedback that the graph is not meaningful, then the max entropy value for the scatter plot is changed to "8" and so on.

Moreover, the invention can learn to categorize individuals according to a cohort factor (i.e., ADHD, Alzheimer's, depression, etc.) such that the learned parameters are stored in a database. Then, when another user uses the invention and is of a same cohort as a prior user, the initial profile used for the new user matches the cohort profile. Thereby, a new user does not need to retrain the invention "from scratch" and instead benefits from the prior learning of the invention from other similar users (i.e., in a same cohort).

In this manner, the invention stores a plurality of profiles that are different for each cohort of users. The user can also pre-select which cohort they identify with when they utilize the invention. Also, since multiple users can interact with the profiles, mass learning can occur where each profile is continuously updated by multiple users of the same cohort.

In one exemplary embodiment where a support vector machine model is used, the model classifies plots (i.e., specified by the type of plot and the columns used to generate the plot) as "informative" or "not informative" based on column names specified in the natural language query that generated the data, columns represented by a feature vector describing the column (i.e., categorical, Boolean, continuous, number of distinct values, range of continuous values, etc.), and an "interestingness" metric based on entropy of the plot data. The model is trained on the label data. Other models that can be used include deep learning to generate and classify plots and reinforcement-learning models that make use of user feedback to learn "informative" plots.

Accordingly, while interacting in a conversation with a chatbot, the invention relies on analysis of the data to discover the interesting dimensions along with what type of plots are going to be presented to the user that provide a meaningful output.

The invention includes a server-side analysis of data to detect and identify the interesting dimensions along with particular plot types that are most suitable to use to present the information to the users.

The invention leverages a combination of an interestingness score with an ontology of rules to provide the ability to determine dynamically the best plot to show the user. The interestingness score computation allows for an informative visualization based on the data that should be plotted based on communication theory.

Exemplar Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 6, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 7:
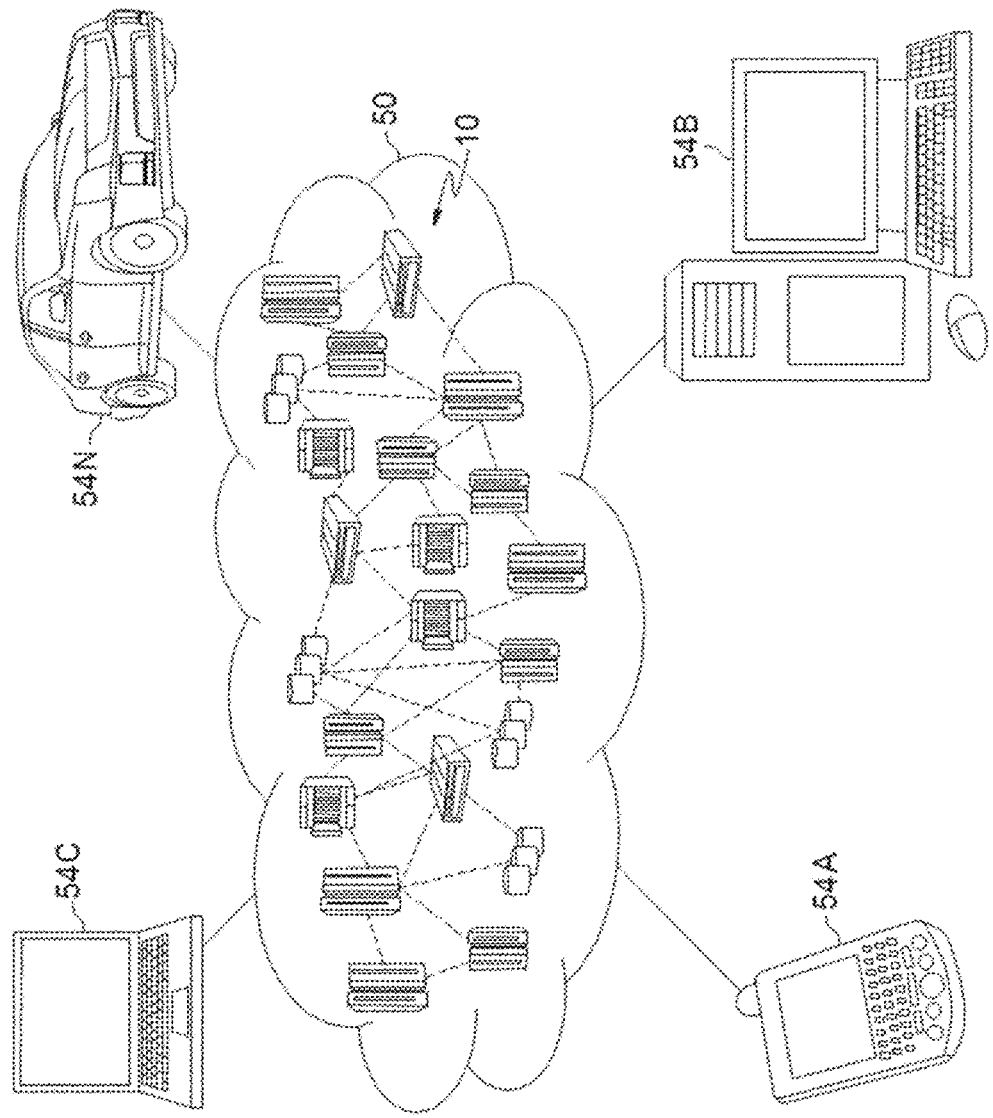
FIG. 7 depicts a cloud computing environment 50 according to an embodiment of the present invention.

Referring now to FIG. 7, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 7 are intended to be illustrative only and that computing nodes 10 and cloud computing environment 50 can communicate with any type of computerized circuit over any type of network and/or network addressable connection (e.g., using a web browser).

Figure 8:
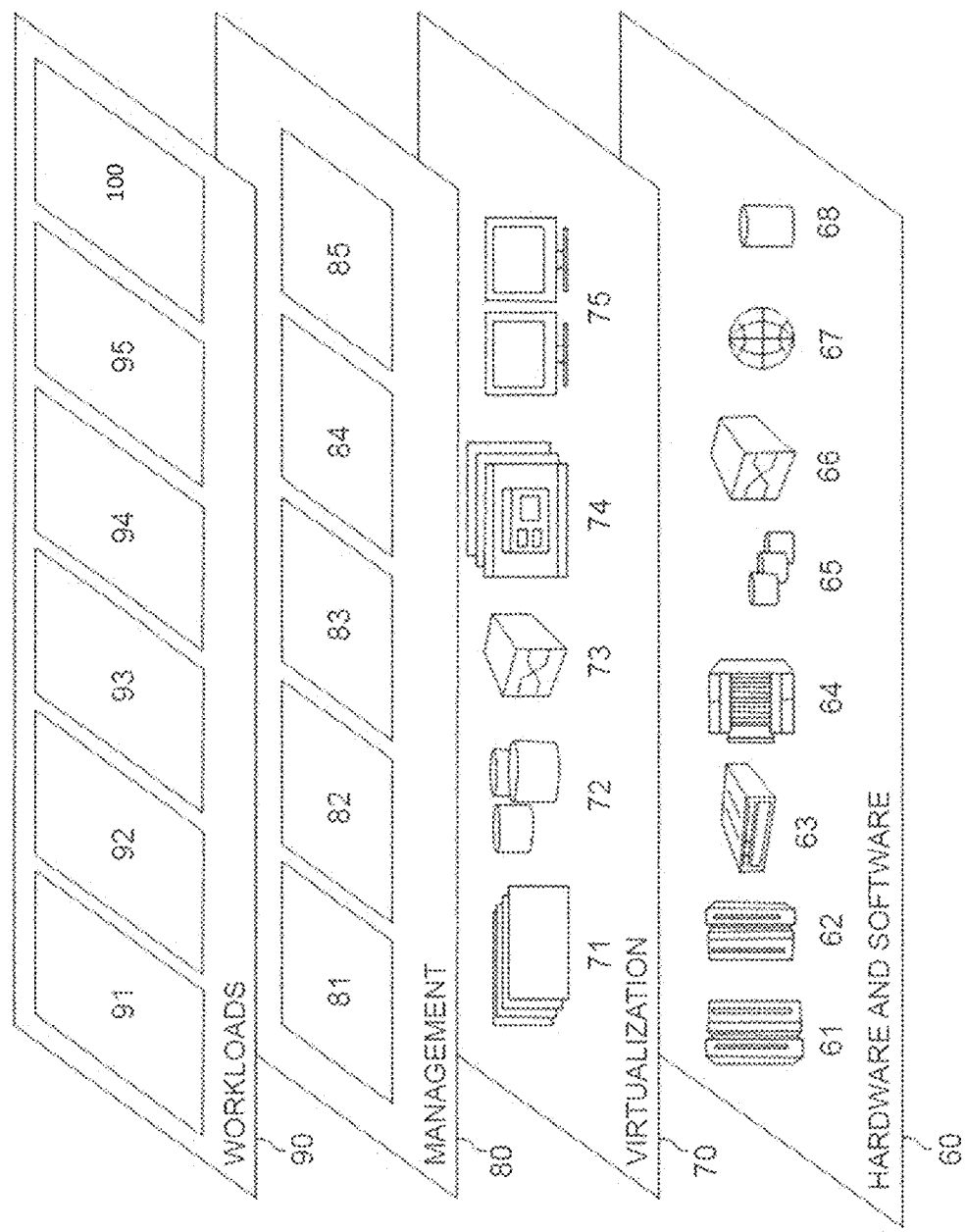
FIG. 8 depicts abstraction model layers according to an embodiment of the present invention.

Referring now to FIG. 8, an exemplary set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the data visualization method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method, comprising:
    identifying an intent from terminology of a natural language query input by a user in a conversation within a chatbot interface of a conversational system;
    receiving a natural language request from the user in the conversation within the conversational system for a data visualization;
    utilizing verbiage from the natural language query, the identified intent, and entities identified from the natural language request to determine one or more data columns for the data visualization;
    extracting, from the determined one or more data columns, one or more features indicative of a data-type of the determined one or more data columns;
    annotating, based on an ontology, the extracted one or more features into a plot-label;
    generating, based on the determined one or more data columns, multiple plots, wherein each plot of the generated multiple plots is of a different plot-type;
    calculating, based on an amount of information associated with each plot of the generated multiple plots, a respective interestingness score for each plot of the generated multiple plots;
    selecting a first plot of the generated multiple plots based on the respective interestingness score of the first plot being highest among interestingness scores of the generated multiple plots, and a plot-type of the first plot corresponding to the annotated plot-label; and
    controlling display, in the conversation with the conversational system, of an ontology-based data visualization in a form of a graph that corresponds to the selected first plot, wherein the ontology-based data visualization leverages context of the conversation.

2. The computer-implemented method of claim 1, wherein the respective interestingness score of the first plot, that is highest, is less than a predefined threshold value.

3. The computer-implemented method of claim 1, further comprising:
    requesting a feedback return for a quality of the ontology-based data visualization; and
    learning from the feedback return with a trained supervised learning model by creating a threshold for an acceptable value for the highest interestingness score of the first plot based upon the trained supervised learning model trained at least in-part with user feedback.

4. The computer-implemented method of claim 1, further comprising:
    requesting a feedback return for a quality of the ontology-based data visualization; and
    learning from the feedback return by creating a threshold for an acceptable value for the highest interestingness score of the first plot and dynamically adjusting the ontology to change the annotated plot-label.

5. The computer-implemented method of claim 1, wherein the computer-implemented method is embodied in a cloud-computing environment.

6. A computer program product comprising a computer-readable storage medium having program instructions embodied therewith, the program instructions executable by a computer to cause the computer to perform:
    identifying an intent from terminology of a natural language query input by a user in a conversation within a chatbot interface of a conversational system;
    receiving a natural language request from the user in the conversation within the conversational system for a data visualization;
    utilizing verbiage from the natural language query, the identified intent, and entities identified from the natural language request to determine one or more data columns for the data visualization;
    extracting, from the determined one or more data columns, one or more features indicative of a data-type of the determined one or more data columns;
    annotating, based on an ontology, the extracted one or more features into a plot-label;

generating, based on the determined one or more data columns, multiple plots, wherein each plot of the generated multiple plots is of a different plot-type;

calculating, based on an amount of information associated with each plot of the generated multiple plots, a respective interestingness score for each plot of the generated multiple plots;

selecting a first plot of the generated multiple plots based on the respective interestingness score of the first plot being highest among interestingness scores of the generated multiple plots, and a plot-type of the first plot corresponding to the annotated plot-label; and controlling display, in the conversation with the conversational system, of an ontology-based data visualization in a form of a graph that corresponds to the selected first plot, wherein the ontology-based data visualization leverages context of the conversation.

7. The computer program product of claim 6, wherein the respective interestingness score of the first plot, that is highest, is less than a predefined threshold value.

8. The computer program product of claim 6, wherein the program instructions further cause the computer to perform:
requesting a feedback return for a quality of the ontology-based data visualization; and
learning from the feedback return with a trained supervised learning model by creating a threshold for an acceptable value for the highest interestingness score of the first plot based upon the trained supervised learning model trained at least in-part with user feedback.

9. The computer program product of claim 6, wherein the program instructions further cause the computer to perform:
requesting a feedback return for a quality of the ontology-based data visualization; and
learning from the feedback return by creating a threshold for an acceptable value for the highest interestingness score of the first plot and dynamically adjusting the ontology to change the annotated plot-label.

10. A system, comprising:
a processor; and
a memory, the memory storing instructions to cause the processor to:
identify an intent from terminology of a natural language query input by a user in a conversation within a chatbot interface of a conversational system;
receive a natural language request from the user in the conversation within the conversational system for a data visualization;
utilize verbiage from the natural language query, the identified intent, and entities identified from the natural language request to determine one or more data columns for the data visualization;
extract, from the determined one or more data columns, one or more features indicative of a data-type of the determined one or more data columns;
annotate, based on an ontology, the extracted one or more features into a plot-label;
generate, based on the determined one or more data columns, multiple plots, wherein each plot of the generated multiple plots is of a different plot-type;
calculate, based on an amount of information associated with each plot of the generated multiple plots, a respective interestingness score for each plot of the generated multiple plots;
select a first plot of the generated multiple plots based on the respective interestingness score of the first plot being highest among interestingness scores of the generated multiple plots, and a plot-type of the first plot corresponding to the annotated plot-label; and
control display, in the conversation with the conversational system, of an ontology-based data visualization in a form of a graph that corresponds to the selected first plot, wherein the ontology-based data visualization leverages context of the conversation.

11. The system of claim 10, wherein the respective interestingness score of the first plot, that is highest, is less than a predefined threshold value.

12. The system of claim 10, further cause the processor to:
request a feedback return for quality of the ontology-based data visualization; and
learn from the feedback return by creating a threshold for an acceptable value for the highest interestingness score of the first plot, and dynamically adjusting the ontology to change the annotated plot-label.

13. The system of claim 10, further cause the processor to:
request a feedback return with a trained supervised learning model for a quality of the ontology-based data visualization; and
learn from the feedback return by creating a threshold for an acceptable value for the highest interestingness score of the first plot based upon the trained supervised learning model trained at least in-part with user feedback.

14. The system of claim 10, wherein the system is embodied in a cloud-computing environment.

* * * * *